(12) United States Patent
Meiri et al.

(10) Patent No.: US 10,007,466 B1
(45) Date of Patent: *Jun. 26, 2018

(54) TRACKING COPY SESSIONS

(71) Applicant: EMC IP Holding Company LLC, Hopkinton, MA (US)

(72) Inventors: David Meiri, Cambridge, MA (US); Xiali He, Upton, MA (US); Sathyanarayan Jaganathan, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/283,856

(22) Filed: Oct. 3, 2016

Related U.S. Application Data

(63) Continuation of application No. 13/537,642, filed on Jun. 29, 2012, now Pat. No. 9,483,355.

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .............. *G06F 3/065* (2013.01); *G06F 3/067* (2013.01); *G06F 3/0619* (2013.01); *G06F 3/0644* (2013.01); *G06F 3/0659* (2013.01)

(58) Field of Classification Search
CPC ...... G06F 3/065; G06F 3/0619; G06F 3/0644; G06F 3/0659; G06F 3/067
See application file for complete search history.

*Primary Examiner* — Mark A Giardino, Jr.
(74) *Attorney, Agent, or Firm* — Muirhead and Saturnelli, LLC

(57) ABSTRACT

Maintaining a set of extents corresponding to a portion of an initial logical volume that is to be copied includes initializing a table having entries corresponding to different portions of the initial logical volume, where each of the entries is initialized with a first value, following initializing the table, providing a second value different from the first value to an entry in the table corresponding to a portion of the initial logical volume to which a write operation is performed and establishing the set of extents, where the first value is provided to entries in the table that correspond to portions of the initial logical device indicated by the extents. Data of the initial logical volume corresponding to the set of extents may be copied to at least one other logical volume.

10 Claims, 10 Drawing Sheets

TRACKING COPY SESSIONS

RELATED APPLICATIONS

This application is a continuation of U.S. application Ser. No. 13/537,642 filed Jun. 29, 2012 (pending), which is hereby incorporated by reference.

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some cases, it may be desirable to perform a copy process by first specifying (and identifying) a set of extents on a source volume that are to be copied. Subsequently, the copy process is initiated with one or more targets. There is a risk that the copy command will copy the wrong data if the data is modified between the time the set of extents is specified and the time that the copy operation is initiated. Although it may be possible to provide write protection/indirect sessions for each of the sets of extents, such a mechanism may become impractical as the number of sets increases.

Accordingly, it is desirable to provide an efficient mechanism to determine if data has been modified between the time one or more sets of extents are specified and the time a copy operation is initiated.

SUMMARY OF THE INVENTION

According to the system described herein, maintaining a set of extents corresponding to a portion of an initial logical volume that is to be copied includes initializing a table having entries corresponding to different portions of the initial logical volume, where each of the entries is initialized with a first value, following initializing the table, providing a second value different from the first value to an entry in the table corresponding to a portion of the initial logical volume to which a write operation is performed and establishing the set of extents, where the first value is provided to entries in the table that correspond to portions of the initial logical device indicated by the extents. Data of the initial logical volume corresponding to the set of extents may be copied to at least one other logical volume. The at least one other logical volume may be on a same storage device as the initial logical volume or on a different storage device as the initial logical volume. There may be at least two other logical volumes. Copying may be aborted in response to any of the entries in the table corresponding to the set of extents having the second value. Each of the sections may correspond to sixty-four kbytes of data on the logical device. Establishing the set of extents may include determining if any of the entries in the table is set to the second value. Maintaining a set of extents corresponding to a portion of an initial logical volume that is to be copied may also include invalidating previously-established sets of extents corresponding to entries in the table that are set to the second value.

According further to the system described herein, computer software, provided in a non-volatile computer-readable medium, maintains a set of extents corresponding to a portion of an initial logical volume that is to be copied. The software includes executable code that initializes a table having entries corresponding to different portions of the initial logical volume, where each of the entries is initialized with a first value, executable code that provides a second value different from the first value to an entry in the table corresponding to a portion of the initial logical volume to which a write operation is performed, and executable code that establishes the set of extents, where the first value is provided to entries in the table that correspond to portions of the initial logical device indicated by the extents. Data of the initial logical volume corresponding to the set of extents may be copied to at least one other logical volume. The at least one other logical volume may be on a same storage device as the initial logical volume or may be on a different storage device as the initial logical volume. There may be at least two other logical volumes. Copying may be aborted in response to any of the entries in the table corresponding to the set of extents having the second value. Each of the sections may correspond to sixty-four kbytes of data on the logical device. Executable code that establishes the set of extents may determine if any of the entries in the table is set to the second value. The software may also include executable code that invalidates previously-established sets of extents corresponding to entries in the table that are set to the second value.

DETAILED DESCRIPTION OF VARIOUS EMBODIMENTS

Figure 1:
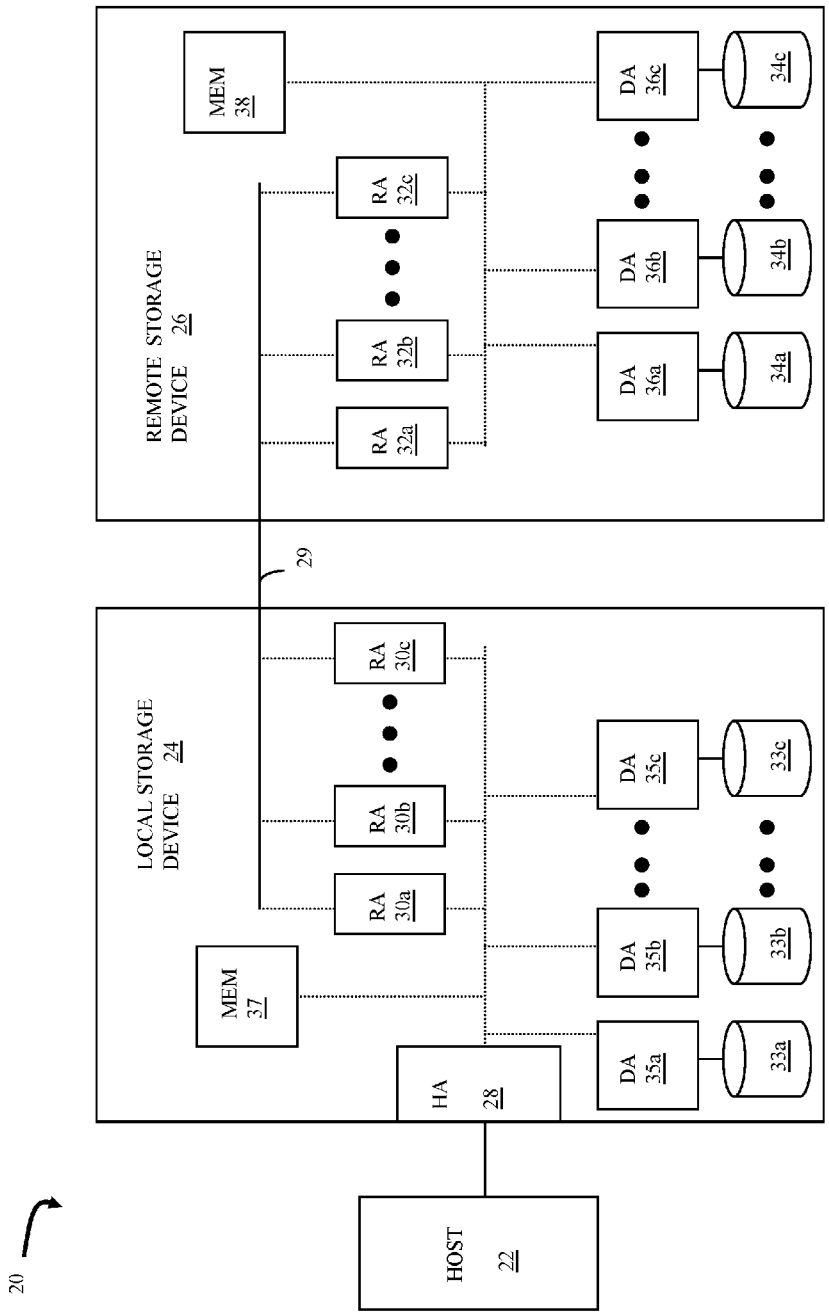
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via a link 29 to cause the data on the remote storage device 26 to be identical to the data on the local storage device 24. In an embodiment herein, data may be copied using a synchronous RDF protocol (SRDR/S), an asynchronous RDF protocol (SRDF/A), and data mobility (DM) copy mode, a non-ordered background copy mode. Of course, other data copy modes may also be used. Communication using synchronous RDF is described, for example, in U.S. Pat. No. 5,742,792 titled "REMOTE DATA MIRRORING" to Yanai, et al., which is incorporated by reference herein. Communication using asynchronous RDF is described, for example, in in U.S. Pat. No. 7,054,883 titled "VIRTUAL ORDERED WRITES FOR MULTIPLE STORAGE DEVICES" to Meiri, et al., which is incorporated by reference herein.

Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail elsewhere herein.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The remote data copying functionality described herein may be applied so that the data for at least a portion of the disks 33a-33c of the local storage device 24 is copied, using RDF or a different mechanism, to at least a portion of the disks 34a-34c of the remote storage device 26. It is possible that other data of the storage devices 24, 26 is not copied between the storage devices 24, 26, and thus is not identical.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 may be used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage, space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c. Other physical storage elements may be used for physical storage, such as flash drives.

Providing a mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the mapping causes modified data to be transferred from the local storage device 24 to the remote storage device 26 using the RA's, 30a-30c, 32a-32c and the link 29. In steady state operation, the logical device on the remote storage device 26 contains data that is identical to the data of the logical device on the local storage device 24. When the RDF mechanism is used, the logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
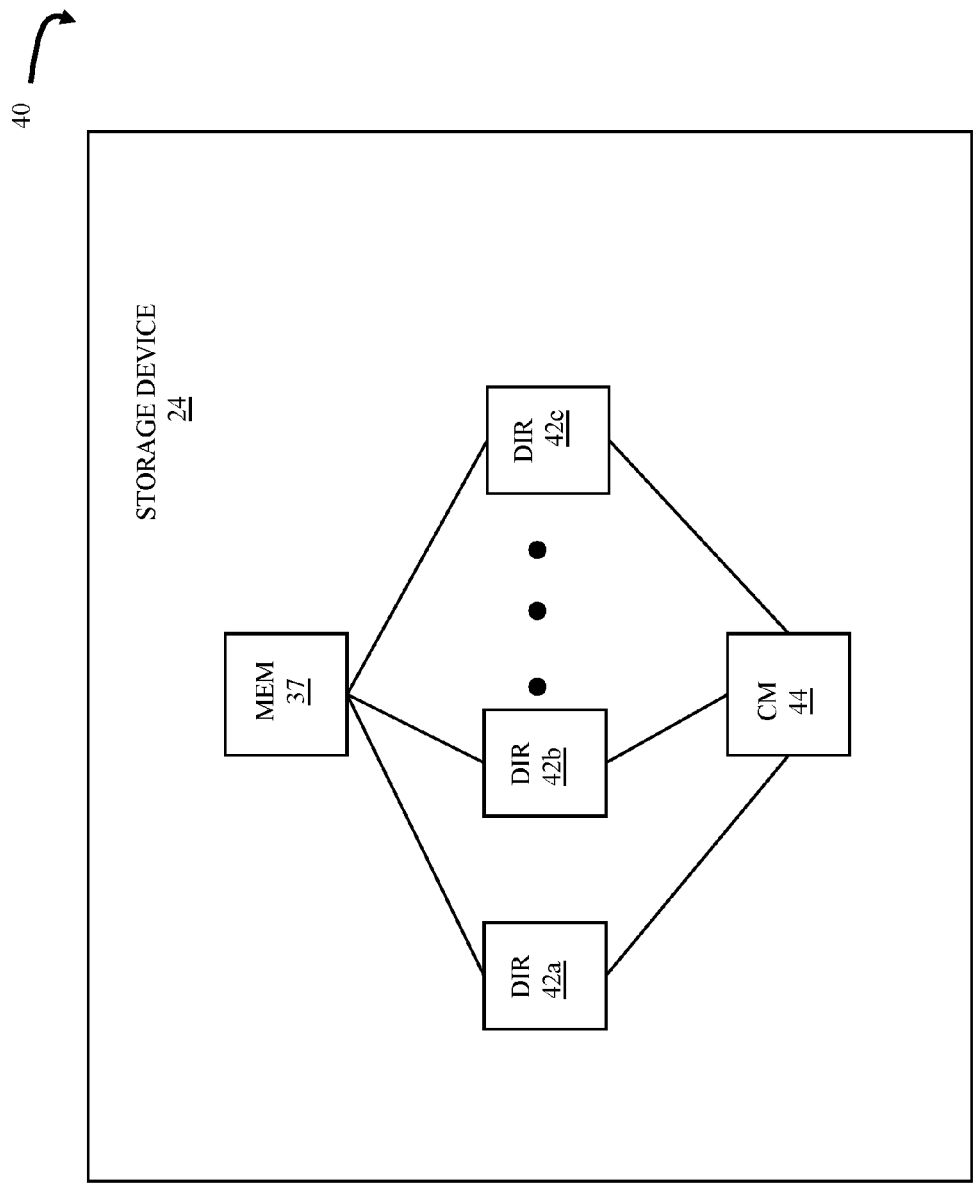
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

The system described herein facilitates copying data between logical storage devices. Initially, a set of extents is identified at a source logical device. Subsequently, data corresponding to the identified set of extents is copied from the source logical device to a target logical device. The system described herein provides a mechanism that determines if any of the data on the source logical device has changed following identifying the set of extents and prior to the data being copied.

Figure 3:
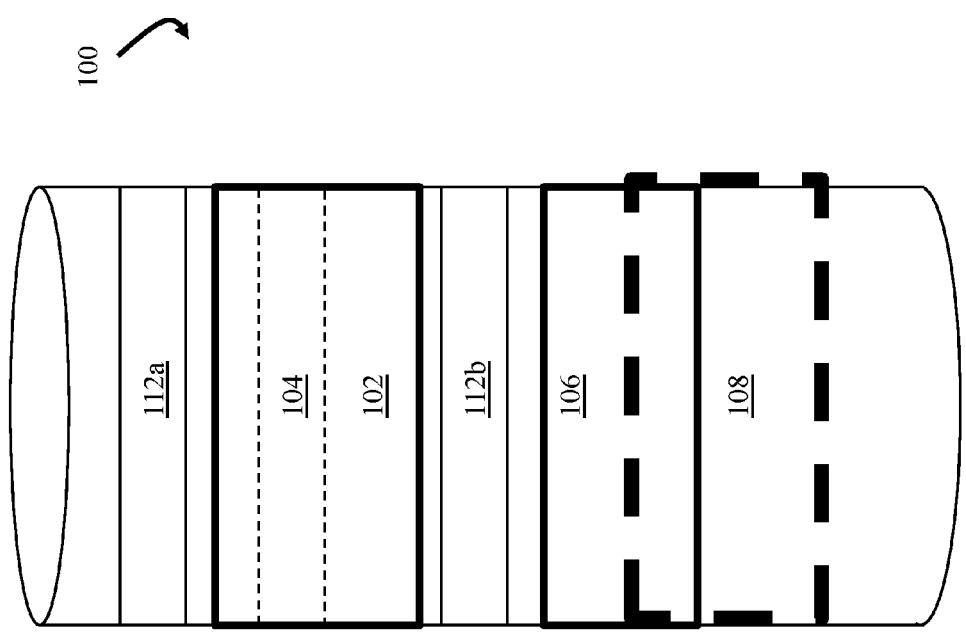
FIG. 3 is a schematic diagram showing a logical storage space and a plurality of extents an embodiment of the system described herein.

Referring to FIG. 3, a source logical device 100 is shown with a plurality of extents, 102, 104, 106, 108, 112a, 112b. It is possible for a set of extents to correspond to a superset of data of the logical volume 100 of another set of extents of the logical volume 100, as illustrated by the set of extents 102 corresponding to data that is a superset of data corresponding to the extents 104. It is also possible for a set of extents to correspond to an overlapping set of data of the logical volume 100 of another set of extents of the logical volume 100, as illustrated by the set of extents 106 corresponding to data that overlaps data corresponding to the set of the extents 108. It is also possible for a set of extents to correspond to data of the logical volume 100 that is non-contiguous, as illustrated by the set of extents 112a, 112b. It is also possible to a set of extents to exhibit more than one of the previously-discussed characteristics so that, for example, a set of extents may represent data that is both non-contiguous and overlaps data corresponding to another set of extents.

In an embodiment herein, a host (or similar entity) first identifies a set of extents of the source logical device 100, such as the set of extents 102. Data corresponding to the identified set of extents is then copied to one or more target logical devices (not shown in FIG. 3). The copying may be provided using any appropriate copying technique, such as the X-Copy mechanism of the Symmetrix storage array provided by EMC Corporation of Hopkinton, Mass.

Figure 4:
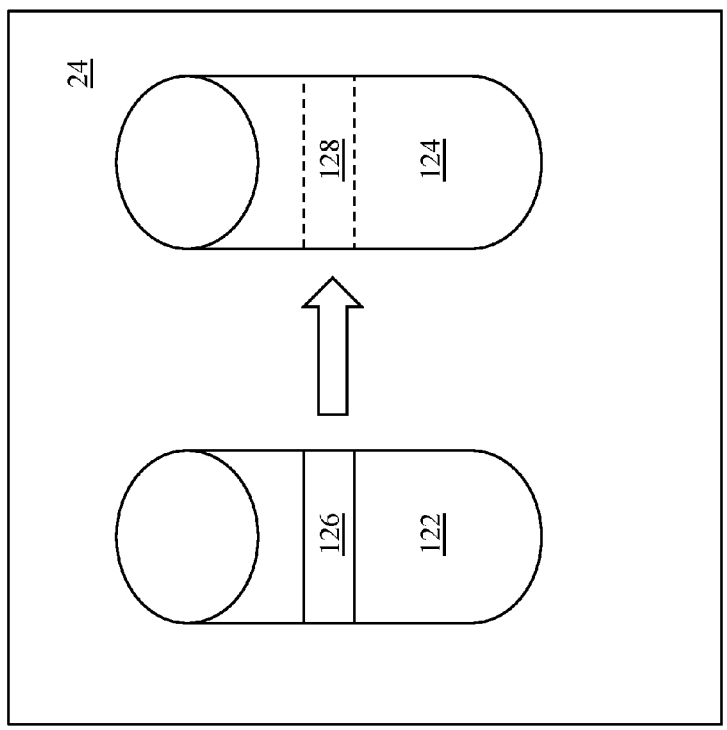
FIG. 4 is a schematic diagram showing data transfer between a first logical volume and a second logical volume in a storage device from a first set of extents in the first logical volume to a second set of extents in the second logical volume according to an embodiment of the system described herein.

Referring to FIG. 4, the local storage device 24 is shown as including a source logical device 122 and a target logical device 124. The logical devices 122, 124 may be located on a same physical device (e.g., one of the disks 33a-33c) of the storage device 24, different physical devices, or partially on the same physical device and partially on different physical devices. In the embodiment illustrated in FIG. 4, physical storage for the logical devices 122, 124 is provided by the local storage device 24.

A first set of extents 126 corresponds to a portion of the source logical device 122 and a second set of extents 128 corresponds to a portion of the destination logical device 124. In an embodiment herein, the portion of the source logical device 122 is first identified using the first set of extents 126 and then, subsequently, a copy operation is initiated to copy data from the portion of the source logical device 122 to the portion of the target logical device 124 indicated by the second set of extents 128.

Initiating the copy operation may protect the data at the portion of the source logical device 122 so that any writes to the portion of the source logical device 122 that occur after initiating the copy operation result in special processing that preserves the state of the data at the time that the copy operation was initiated. For example, a write to a specific address in the portion of the source logical storage device 122 may result in the data at the specific address first being copied to a corresponding address in the portion of the target logical device 124 prior to completing the write operation. Other mechanisms exist for protecting data, such as performing a conventional snapshot copy prior to transferring the data to the target logical storage device 124.

Figure 5:
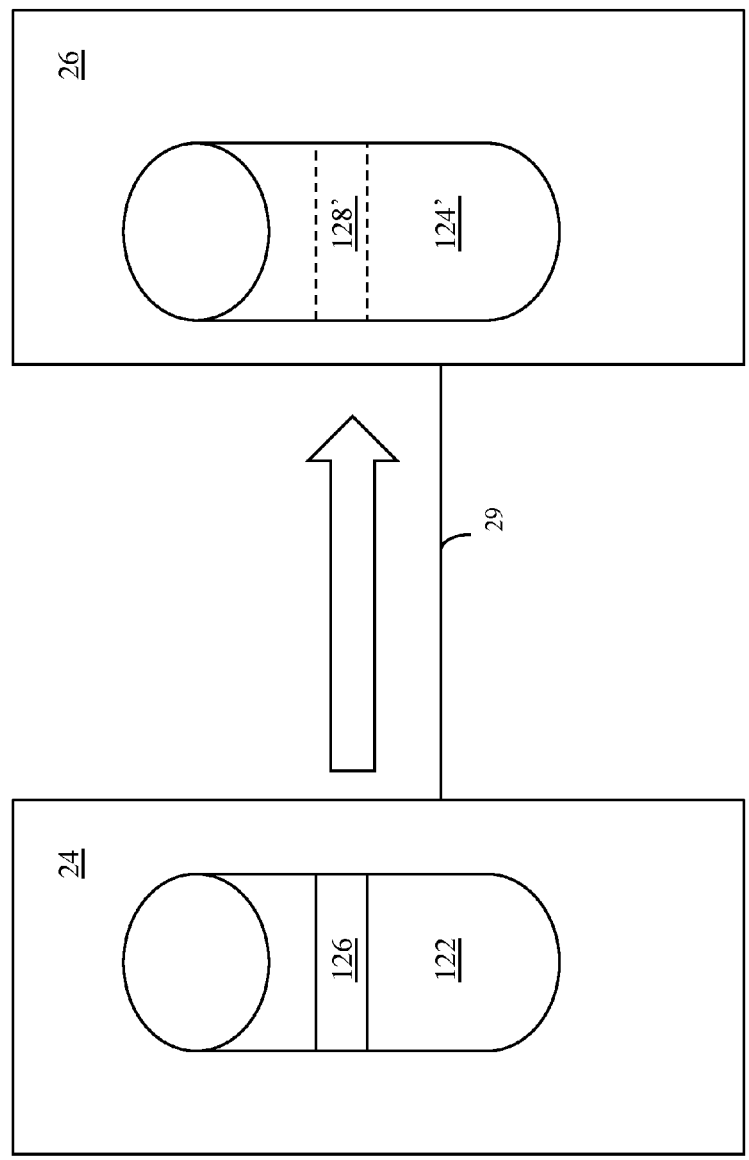
FIG. 5 is a schematic diagram showing data transfer between a first logical volume in a first storage device and a second logical volume in a second storage device from a first set of extents in the first logical volume to a second set of extents in the second logical volume according to an embodiment of the system described herein.

Referring to FIG. 5, the source logical volume 122 is shown on the local storage device 24 while a target logical volume 124' having a third set of extents 128' is shown on the remote storage device 26. Identifying and copying data from the source logical volume 124 to the target logical volume 126' is similar to the mechanism described herein in connection with the source logical volume 124 and the target logical volume 126, except that copying is provided from the local storage device 24 to the remote storage device 26 via the link 29.

Figure 6:
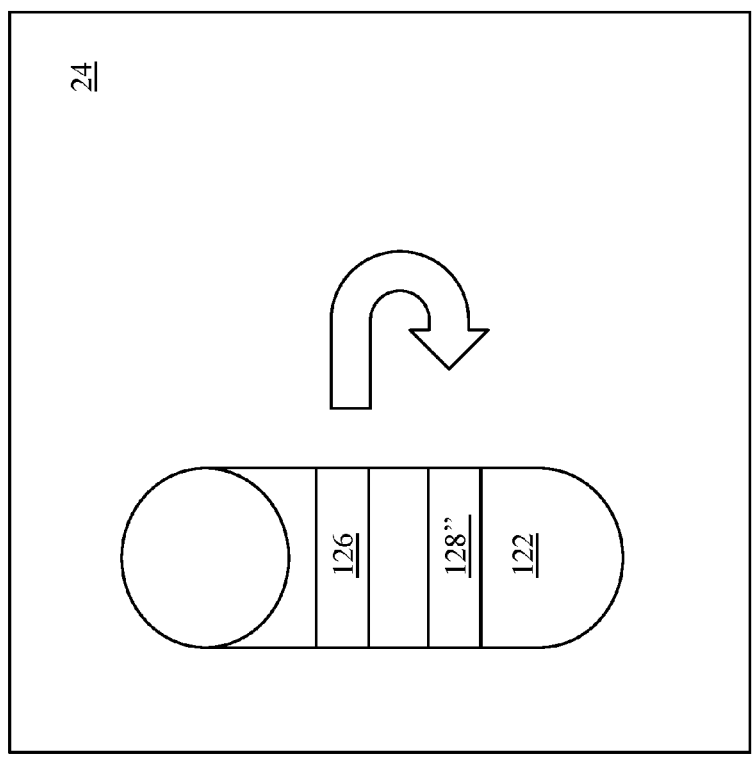
FIG. 6 is a schematic diagram showing data transfer for a logical volume in a storage device from a first set of extents in the logical volume to a second set of extents in the logical volume according to an embodiment of the system described herein.

Referring to FIG. 6, the source logical volume 122 is shown with the first set of extents 126 and a fourth set of extents 128" also provided on the source logical volume 122. Identifying and copying data from first set of extents 126 on the source logical volume 122 to the fourth set of extents 128" on the source logical volume 122 is similar to the mechanism described herein in connection with the source logical volume 124 and the target logical volume 126, except that copying is provided both from and to the logical volume 122.

Figure 7:
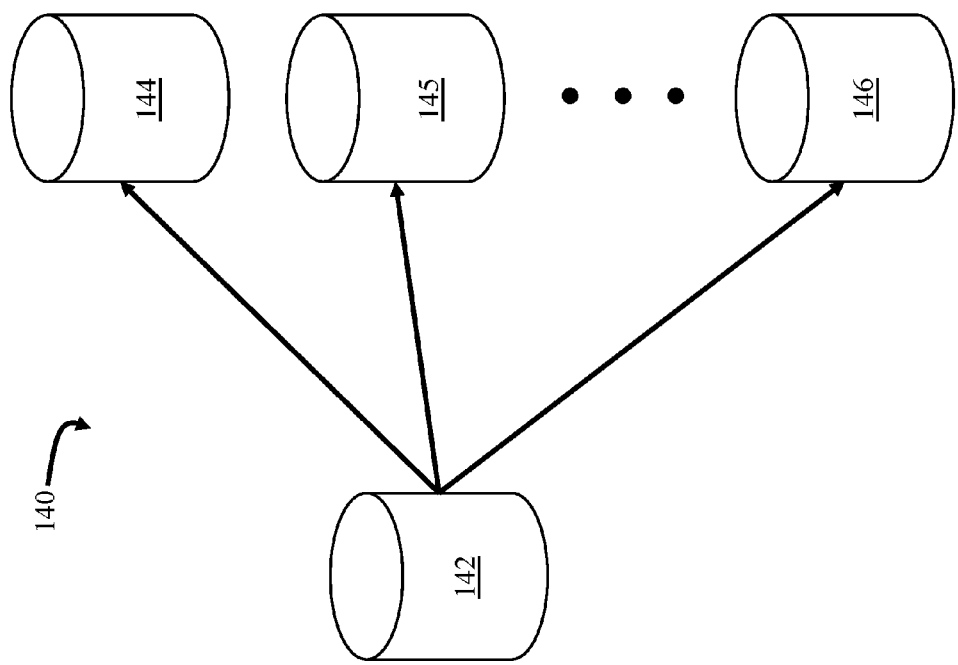
FIG. 7 is a schematic diagram showing data transfer from a first logical volume to a plurality of logical volumes according to an embodiment of the system described herein.

Referring to FIG. 7, a diagram 140 illustrates copying data from a single source volume 142 to a plurality of destination volumes 144-146. Each of the destination volumes 144-146 may be on the same storage device as the source volume 142, on a different storage device than the source volume 142, or some combination thereof. Note also that, although not shown explicitly in the diagram 140, it is possible for at least one of the destinations for copying data to be the source volume 142, as described elsewhere herein.

Figure 8:
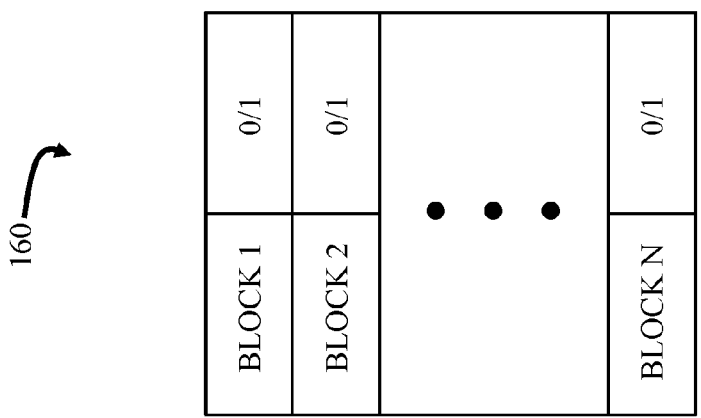
FIG. 8 is a schematic diagram showing a table used for maintaining status of sections of a logical volume according to an embodiment of the system described herein.

Referring to FIG. 8, a table 160 includes a plurality of entries that correspond to a logical device where each of the entries corresponds to a different portion of the logical device. A first entry in the table corresponds to Section 1 of the logical device, a second entry in the table 160 corresponds to Section 2, etc. Each of the entries includes a value field labeled "0/1", which is set to either zero or one depending upon a state of data of the corresponding section, as described in more detail elsewhere herein. The values zero and one may act as markers that correspond to various sections of the logical device. In an embodiment herein, each of the entries may correspond to a logical block (sixty-four kbytes) of data, although other sizes are possible depending upon the desired granularity, the tolerance for overhead associated with handling the table 160, and the size of the table 160. Variable sized sections are also possible. The table 160 may be implemented using an array, a linked list, and/or any other appropriate data structure and/or mechanism.

Figure 9:
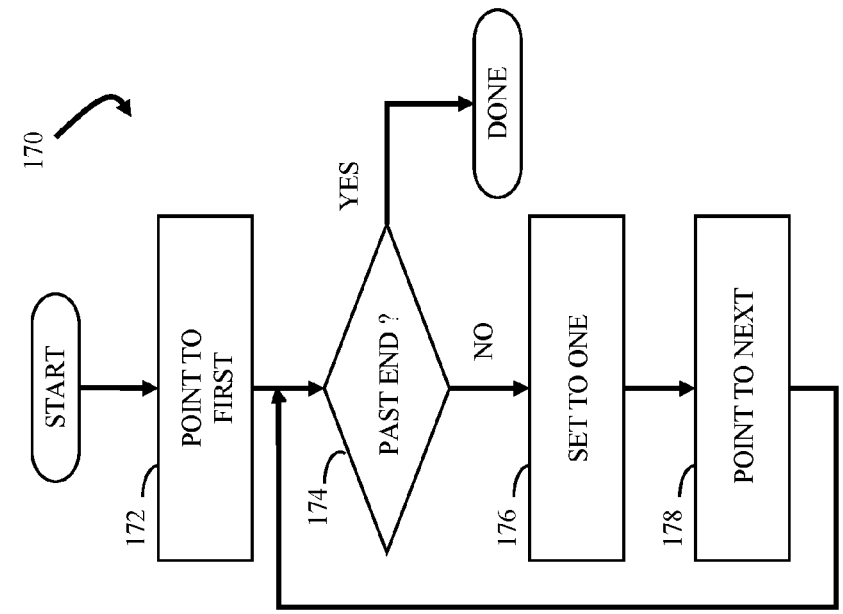
FIG. 9 is a flow, chart illustrating steps performed in connection with initializing a table used for maintaining status of sections of a logical volume according to an embodiment of the system described herein.

Referring to FIG. 9, a flow chart 170 illustrates steps performed in connection with initializing the table 160. Processing begins at a first step 172 where an iteration pointer (counter), which is used to iterate through the entire table 160, is set to point to the first entry in the table 160. Following the step 172 is a step 174 where it is determined if the iteration pointer points past the end of the table 160 (i.e., all entries in the table 160 have been processed). If so, then processing is complete. Otherwise, control transfers from the test step 174 to a step 176 where a value field of an entry in the table corresponding to the iteration pointer is set to one. Following the step 176 is a step 178 where the iteration pointer is incremented. Following the step 178, control transfers back to the step 174, discussed above.

Figure 10:
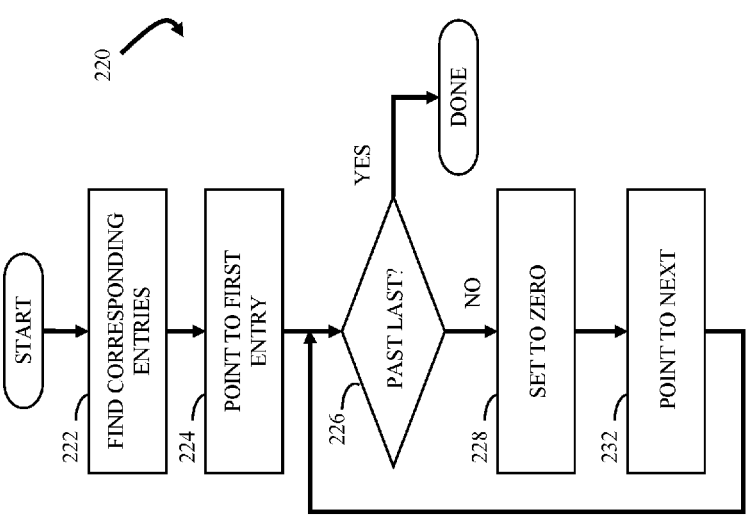
FIG. 10 is a flow chart illustrating steps performed in connection with establishing a set of extents according to an embodiment of the system described herein.

Referring to FIG. 10, a flow chart 190 illustrates steps performed in connection with writing to a logical volume. Processing begins at a first step 192 where entries in the table 160 are found that correspond to the portions of the logical volume to which the write is being performed. Following the step 192 is a step 194 where an iteration pointer is set to point to a first one of the corresponding entries in the table.

Following the test step 194 is a test step 196 where it is determined if the iteration pointer points past the last of the corresponding entries (i.e., all the entries have been processed). If so, then processing is complete. Otherwise, control transfers from the test step 196 to a step 198 where the value of the entry is set to zero, indicating that a write has been performed to the corresponding portion of the logical volume. Following the step 198 is a step 202 where the iteration pointer is incremented. Following the step 202, control transfers back to the step 196 for another iteration.

Figure 11:
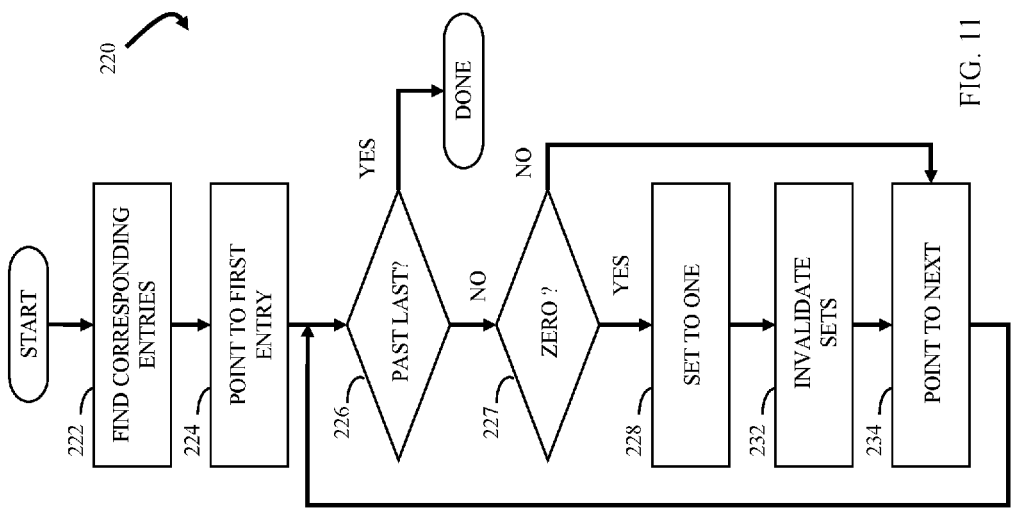
FIG. 11 is a flow chart illustrating processing performed in connection with writing data according to an embodiment of the system described herein.

Referring to FIG. 11, a flow chart 220 illustrates steps performed in connection with establishing a set of extents. Processing begins at a first step 222 where entries in the table 160 are found that correspond to the extents (portions of the logical volume). Following the step 222 is a step 224 where an iteration pointer is set to point to a first one of the corresponding entries. Following the step 224 is a test step 226 where it is determined if the iteration pointer points past the last of the corresponding entries (i.e., all entries have been processed). If so, then processing is complete. Otherwise, control transfers from the test step 226 to a test step 227 where it is determined if the entry indicated by the current value of the iteration pointer has a value of zero. As discussed elsewhere herein, a value of zero for an entry in the table 160 indicates that a write has been performed to the corresponding portion of the logical volume. Note that any write invalidates any previously-established sets of extents that correspond to that entry in the table 160.

If it is determined at the test step 227 that the entry indicated by the current value of the iteration pointer has a value of zero, then control transfers from the test step 227 to a step 228 where the value is set to one, for the benefit of the current set of extents being established. Following the step 228 is a step 232 where any previously-established sets of extents that correspond to the entry in the table 160 indicated by the iteration pointer are invalidated. Invalidating the sets of extents at the step 232 is discussed in more detail elsewhere herein. Following the step 232 is a step 234 where the iteration pointer is incremented. Note that the step 234 is also reached from the step 227 if the value of the entry in the table 160 indicated by the iteration pointer is initially not zero. Following the step 234, control transfers back to the step 226 for another iteration.

Figure 12:
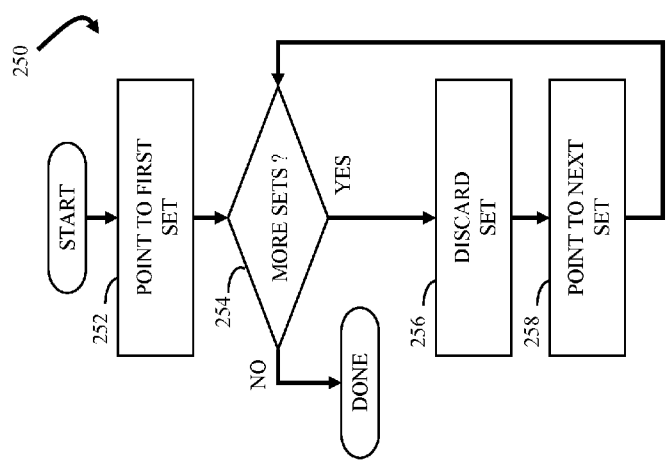
FIG. 12 is a flow chart illustrating processing performed in connection with invalidating sets of extents according to an embodiment of the system described herein.

Referring to FIG. 12, a flow chart 250 illustrates in more detail processing performed at the step 232, discussed above, where sets of extents corresponding to an entry in the table 160 are invalidated. Processing begins at a first step 252 where an iteration pointer is initialized. The iteration pointer is used to iterate through all of the sets of extents that include the entry in the table 160. Following the step 252 is a test step 254 where it is determined if all of the sets have been processed. If so, then processing is complete. Otherwise, control transfers from the test step 254 to a step 256 where the set of extents corresponding to the iteration pointer is discarded (i.e., erased/invalidated). Following the step 256 is a step 258 where the iteration pointer is incremented. Following the step 258, control transfers back to the step 254, discussed above, for another iteration.

Figure 13:
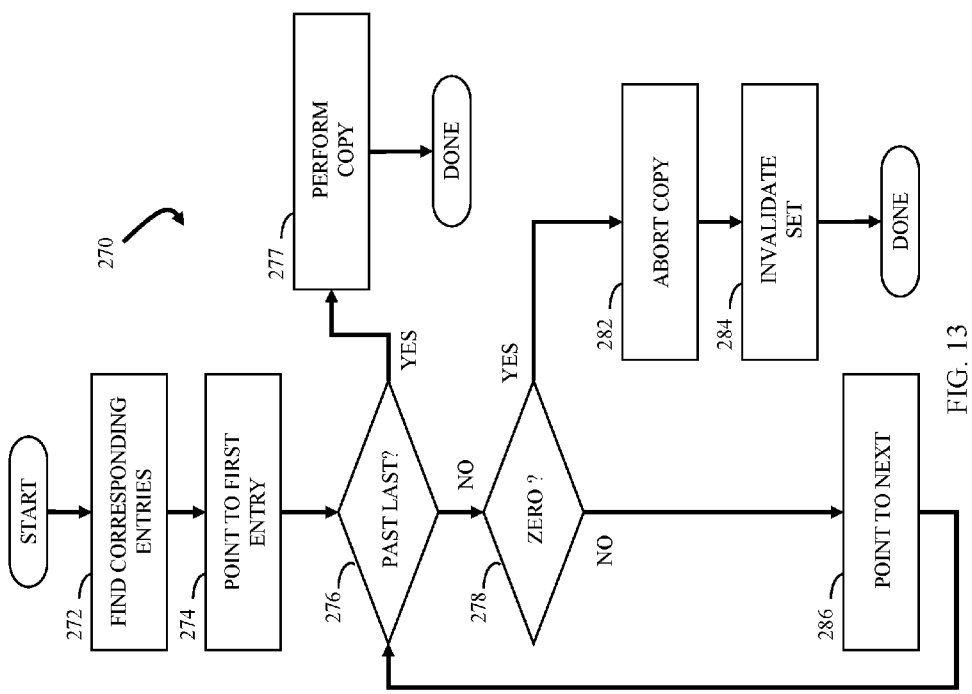
FIG. 13 is a flow chart 270 illustrates processing performed in connection with copying data defined by a set of extents according to an embodiment of the system described herein.

Referring to FIG. 13, a flow chart 270 illustrates processing performed in connection with copying data defined by a set of extents (portions of the logical volume). Processing begins at a first step 272 where entries in the table 160 are found that correspond to the set of extents. Following the step 272 is a step 274 where an iteration pointer is set to point to a first one of the corresponding entries. Following the step 274 is a test step 276 where it is determined if the iteration pointer points past the last of the corresponding entries (i.e., all entries have been processed). If so, then all of the entries have been processed and none have been found to have a zero, indicating that none of the corresponding portions of the logical volume have been written since the set of extents was established. Accordingly, control transfers from the test step 276 to a step 277 where the copy operation is performed. Following the step 277, processing is complete.

If it is determined at the test step 276 that the iteration pointer does not point past the last entry, then control transfers from the test step 276 to a test step 278 where it is determined if the entry indicated by the current value of the iteration pointer has a value of zero. As discussed elsewhere herein, a value of zero for an entry in the table 160 indicates that a write has been performed to the corresponding portion of the logical volume. Note that any write invalidates any previously-established sets of extents that correspond to that entry in the table 160.

If it is determined at the test step 278 that the entry indicated by the current value of the iteration pointer has a value of zero, then control transfers from the test step 278 to a step 282 where the copy operation is aborted. Following the step 282 is a step 284 the set of extents corresponding to the attempted copy is invalidated. Following the step 284, processing is complete. If it is determined at the test step 278 that the entry indicated by the current value of the iteration pointer does not have a value of zero, then control transfers from the test step 278 to a step 286 where the iteration pointer is incremented. Following the step 286, control transfers back to the step 276 for another iteration.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is provided in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of copying data from an initial logical volume to at least one other logical volume, comprising:
   initializing a table having entries corresponding to different portions of the initial logical volume, wherein each of the entries is initialized with a first value;
   following initializing the table, providing a second value different from the first value to an entry in the table corresponding to a portion of the initial logical volume to which a write operation is performed;
   establishing a set of extents corresponding to entries in the table for portions of the initial logical volume having the first value;
   invalidating the set of extents in response to determining that at least one entry in the table was set to the second value following establishing the set of extents; and
   copying data of the initial logical volume corresponding to the set of extents to at least one other logical volume, wherein copying all the data is aborted in response to the set of extents being invalidated while the data is being copied.

2. A method, according to claim 1, wherein the at least one other logical volume is on a same storage device as the initial logical volume.

3. A method, according to claim 1, wherein the at least one other logical volume is on a different storage device as the initial logical volume.

4. A method, according to claim 1, wherein there are at least two other logical volumes.

5. A method, according to claim 1, wherein each of the entries in the table corresponds to sixty-four kbytes of data on the initial logical device.

6. A non-transitory computer-readable storage medium containing software that copies data from an initial logical volume to at least one other logical volume, the software comprising:
   executable code that initializes a table having entries corresponding to different portions of the initial logical volume, wherein each of the entries is initialized with a first value;
   executable code that provides a second value different from the first value to an entry in the table corresponding to a portion of the initial logical volume to which a write operation is performed;
   executable code that establishes a set of extents corresponding to entries in the table for portions of the initial logical volume having the first value;
   executable code that invalidates the set of extents in response to determining that at least one entry in the table was set to the second value following establishing the set of extents and
   executable code that copies data of the initial logical volume corresponding to the set of extents to at least one other logical volume, wherein copying all the data is aborted in response to the set of extents being invalidated while the data is being copied.

7. A non-transitory computer-readable storage medium, according to claim 6, wherein the at least one other logical volume is on a same storage device as the initial logical volume.

8. A non-transitory computer-readable storage medium, according to claim 6, wherein the at least one other logical volume is on a different storage device as the initial logical volume.

9. A non-transitory computer-readable storage medium, according to claim 6, wherein there are at least two other logical volumes.

10. A non-transitory computer-readable storage medium, according to claim 6, wherein each of the sections corresponds to sixty-four kbytes of data on the logical device.

* * * * *